UNITED STATES PATENT OFFICE.

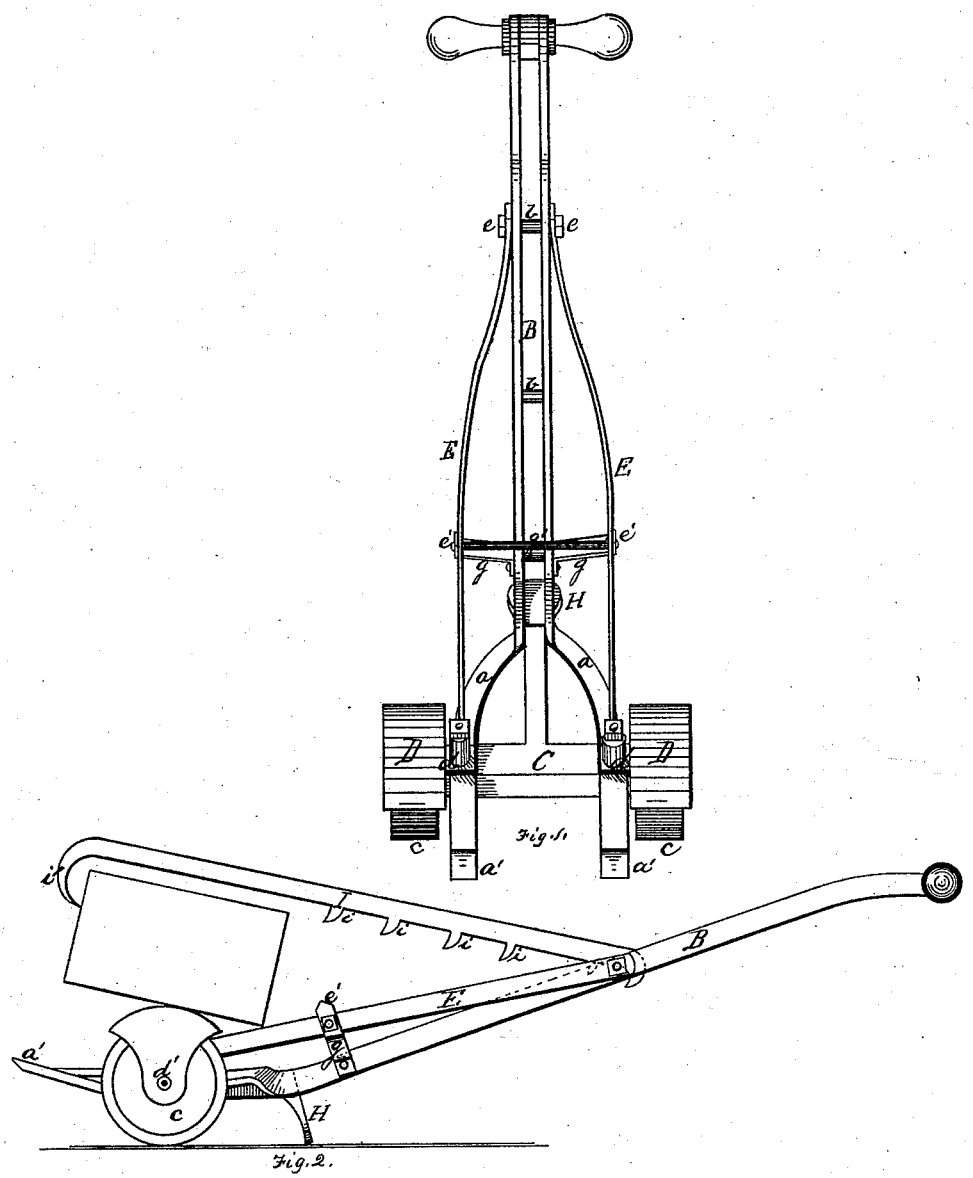

JOHN BIGGERSTAFF, OF PITTSBURG, PENNSYLVANIA, ASSIGNOR TO HIMSELF AND THOMAS A. GILLESPIE, OF SAME PLACE.

IMPROVEMENT IN HAND-TRUCKS.

Specification forming part of Letters Patent No. 169,617, dated November 9, 1875; application filed April 6, 1875.

*To all whom it may concern:*

Be it known that I, JOHN BIGGERSTAFF, of Pittsburg, in the county of Allegheny and State of Pennsylvania, have invented a new and useful Improvement in Self-Loading Hand-Trucks; and I do hereby declare the following to be a full, clear, and exact description thereof, reference being had to the accompanying drawing, forming part of this specification, in which—

Figure 1 is a perspective view of a hand-truck embodying my invention, the grappling-hook being removed. Fig. 2 is a side view, showing the manner of supporting and securing the loads upon the truck.

Like letters refer to like parts wherever they occur.

My invention relates to the construction of self-loading hand-trucks, more especially that class of trucks with which a grappling-hook is employed in seizing and adjusting the load; and it consists, first, in providing the truck with braces and struts, so as to increase the surface upon which the load rests, and this without materially increasing the weight of the truck; second, in providing the tongue of the truck with a foot-rest or equivalent device, so that weight of the user may be utilized in loading and unloading the truck.

Heretofore the construction of this class of hand-truck has been such that the load was carried either forward of the axle, as in a lever of the first power, or in rear of the axle, as in a lever of the second power, in either of which cases the user of the truck is compelled to exert more or less power, while the object of the present invention is to so construct the truck that the weight shall be distributed over the axle, and relieve the user from the necessity of exerting more force than is required to propel the truck.

I will now proceed to describe my invention, so that others skilled in the art to which it appertains may be enabled to apply the same.

In the drawing, A A is the truck-frame, having a slotted tongue, B, provided with a series of pins, $b\ b$, which engage with the hooks on the grappling-hook. This truck-frame is secured to the axle C, and provided with the usual wheels $c\ c$, which I protect by guards or shield-plates D D, generally secured on the inner side, as at $d$, to the truck-frame A, and upon the outer side to the axle, as at $d'$, so as to support any superimposed load without liability of cramping the wheels. It is evident the construction of the guard-pieces D D may be varied. E E are brace-rails, secured below to the frame A at points near the outer side of the frame, and bolted above, as at $e$, to the tongue, the object being to give an extended support to the load; and, in order that these braces may be of such nature as not to materially increase the weight and cost of the truck, I support them at one or more points by cross-pieces $g$ and struts $g'$, so that lightness and strength are both secured. $e'$ are a series of projections or points, fixed to the tongue or along the braces E at such points as may be found desirable, and are intended to engage with or take hold upon the load, so as to prevent it from slipping or shifting about on the truck. Upon the under side of the frame A, or at a convenient point upon the under side of the slotted tongue B, is formed a foot-rest, H, employed in forcing the forward part $a'\ a'$ of the frame A beneath the article to be lifted, and also to enable the operator to utilize the weight of his body in loading and unloading the truck. This foot-rest H may be so formed as to act as a leg to support the tongue when the truck is not in use. I is a lever, provided on one edge with a series of hooks, $i\ i$, which engage with pins $b\ b$ of the slotted tongue, and having grappling-hooks $i'\ i'$, which clutch or hold the load upon the truck.

These devices are employed by placing the foot upon the foot-rest H and forcing the ends $a'\ a'$ of the frame beneath the object to be lifted, after which the grappling hook or lever I is adjusted so as to bring the load over the axle when tongue B is depressed. Tongue B is next depressed, the weight of the person being thrown upon H to assist the action, and the load is thus brought down upon the truck, being held in position by grappling-hook I and projections $e'$.

Having thus set forth the nature and advantages of my invention, what I claim, and desire to secure by Letters Patent, is—

1. In combination with the truck-frame A, the guards or shield-plates D D, secured on the inner side to the truck-frame and on the outer side to the axle, substantially as and for the purpose specified.

2. In combination with truck-frame A, having tongue B, braces E E and struts $g\ g'$, substantially as and for the purpose specified.

3. In combination with the truck-frame A and tongue B, the braces E E, provided with the points or projections $e'$, substantially as and for the purpose specified.

4. In combination with a self-loading hand-truck, foot-rest H, attached thereto, substantially as and for the purpose specified.

In testimony whereof I, the said JOHN BIGGERSTAFF, have hereunto set my hand.

JOHN BIGGERSTAFF.

Witnesses:
  T. A. GILLESPIE,
  F. W. RITTER, Jr.